UNITED STATES PATENT OFFICE.

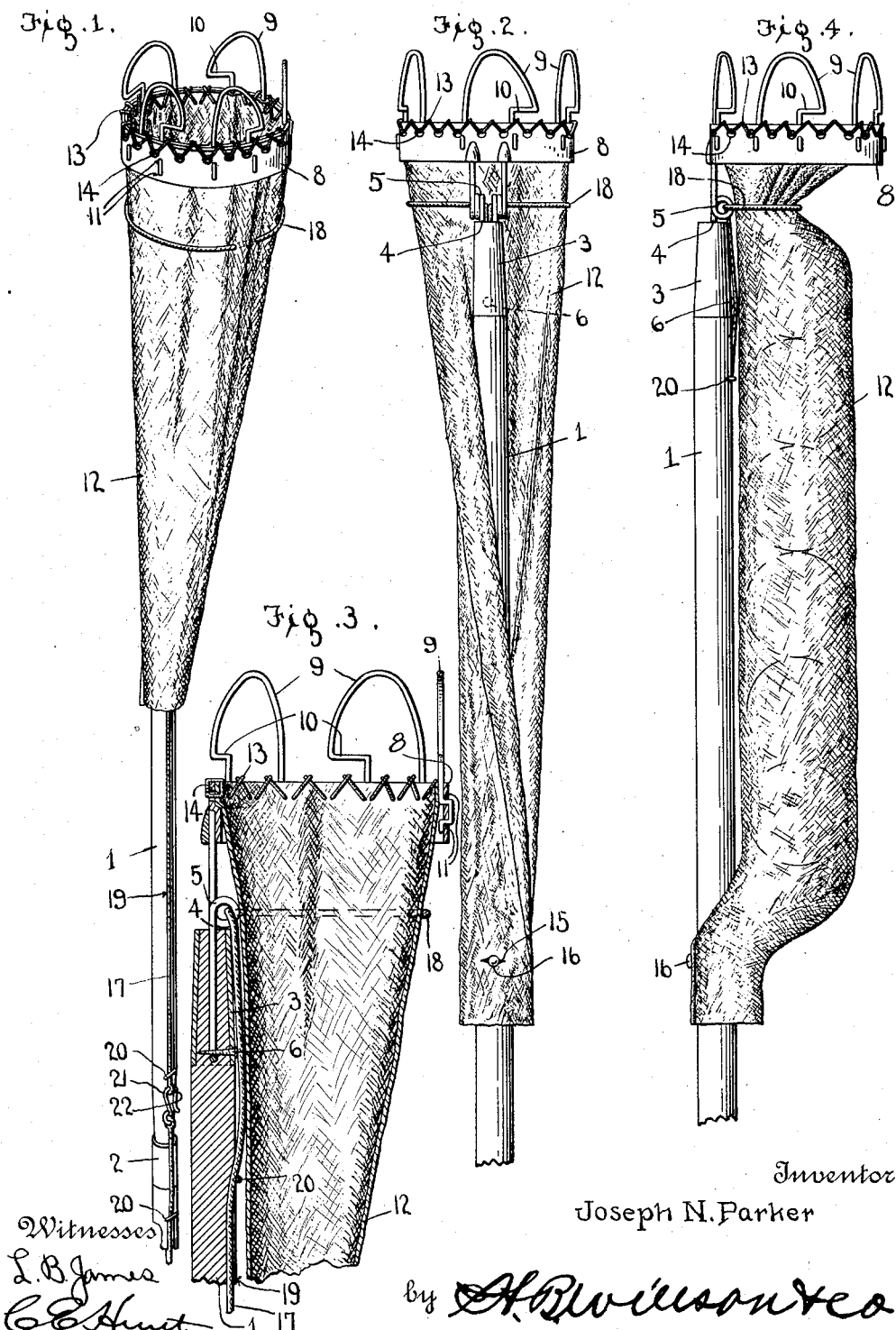

JOSEPH N. PARKER, OF KINGFIELD, MAINE.

FRUIT-PICKER.

1,025,826.  Specification of Letters Patent.  Patented May 7, 1912.

Application filed December 28, 1911. Serial No. 668,232.

*To all whom it may concern:*

Be it known that I, JOSEPH N. PARKER, a citizen of the United States, residing at Kingfield, in the county of Franklin and State of Maine, have invented certain new and useful Improvements in Fruit-Pickers; and I do declare the following to be a full, clear, and exact description of the invention, such as will enable others skilled in the art to which it appertains to make and use the same.

This invention relates to improvements in fruit pickers.

One object of the invention is to provide a fruit picker having an improved construction and arrangement of pickers whereby the fruit is readily separated from the limbs or branches of the tree and which are so constructed as to prevent the same from readily catching and becoming tangled in the branches.

Another object is to provide a fruit picker having an improved means for receiving the picked fruit and means whereby the fruit may be lowered and discharged from the receptacle from a ladder or elevated position in a tree.

With these and other objects in view, the invention consists of certain novel features of construction, and the combination and arrangement of parts as will be more fully described and claimed.

In the accompanying drawings; Figure 1 is a perspective view of my improved fruit picker; Fig. 2 is a rear view thereof; Fig. 3 is an enlarged central vertical section of the upper end or head of the picker; Fig. 4 is a side view showing the manner in which the upper end of the fruit receptacle is closed to permit the fruit to be lowered from a ladder or tree.

My improved fruit picker comprises a pole or handle 1 formed of a plurality of detachably connected sections of suitable length and which are provided on one end with a ferrule 2 to receive the adjoining end of the next adjacent section whereby the length of the pole may be increased or diminished when desired. On the upper or outer end of the upper section of the handle is arranged a ferrule 3 and in said upper end and ferrule is arranged the looped inner end of a spring wire shank 4, preferably formed from a single piece of spring wire bent intermediate its ends to form the handle engaging loop. The ends of the shank extend a suitable distance above the upper end of the pole and the ferrule 3 and are bent to form spring coils 5. The loop shaped inner end of the shank is secured in the end of the pole and in the ferrule by a screw or rivet 6 inserted through the inner portion of the ferrule and the outer end of the handle as shown.

To the outer ends of the wire forming the shank is secured a picking head comprising a sheet metal band 8 to one side of which the upper ends of the shanks are soldered or otherwise rigidly secured. To the band are secured a plurality of pickers 9 which are spaced apart around the band and project a suitable distance above the same. The pickers 9 are formed each from a strip of wire bent into inverted U-shape, one leg of which is bent inwardly at substantially right angles to form an offset 10 and again bent into parallelism with the other leg, the legs being inserted back and forth through upper and lower apertures 11 formed in the cylinder or band 8 and soldered or otherwise rigidly secured to the cylinder. When thus arranged the pickers will project a suitable distance above the upper edge of the cylinder with the offsets 10 therein all projecting in the same direction and spaced a suitable distance above the upper edge of the band 8 to facilitate the engagement of the offsets with the stems of the fruit to be picked, and which, when thus engaged and the picker turned to the right, will pick the fruit from the branches without bruising or injuring it in any manner.

In order to catch the fruit after it has been picked, I provide a suitable receptacle 12 which is here shown in the form of a tube of canvas or similar fabric having a diameter corresponding substantially with the inner diameter of the band 8 to which the upper end of the tube is secured preferably by inserting it in the band to which the inserted end is fastened by a cord 13 laced through eyelets or holes 14 formed in the upper portion of the band and through the tube, the cord being preferably passed through the eyelets or holes and over the upper edge of the band as shown. By thus arranging and fastening the tube it will be seen that all roughness or projections on the inner side of the cylinder which might bruise or injure the fruit are covered by the upper end of the tube.

The tube 12 may be of any suitable length and has its lower end open. At suitable points in the opposite sides of the tube near its lower end are formed button holes or eyelets 15 which are adapted to be engaged over a headed stud 16 secured in the rear side of the upper section of the pole after the lower end of the tube has been drawn around the pole as clearly shown in the drawings, whereby this end of the tube will be closed to retain the fruit picked therein.

In order to permit the fruit to be lowered and discharged into a suitable receptacle on or near the ground from a ladder or elevated position in the tree, I provide means for closing the upper end of the tube, thus permitting the picker to be inverted and the upper end thereof lowered to a suitable position for discharging the fruit into the receptacle. The means for closing the upper end of the tube is here shown as a cord 17 having in its upper end a loop 18 which engages the tube near its upper end as shown. The ends of the loop pass through the spring coils 5 of the shank 4 and the cord extends downwardly through a guide groove 19 formed in one side of the sections of the handle, being held in the groove by staples 20 or other suitable means.

Each section of the handle is provided with a section of cord and when the sections of the handle are joined the adjacent ends of the cord sections are connected by a hook 21, secured to the upper end of one cord section, with which engages a loop 22 formed in the lower end of the adjoining cord section as shown. When the cord is pulled the loop 18 in the upper end thereof will be drawn inwardly, thus drawing the sides of the tube together and closing the outer end thereof when the handle may be reversed and the picking or head end of the device lowered to a position for discharging the contents of the tube into a receptacle provided to receive the fruit, the weight of which, when the cord is released, will force the contracted outer end of the tube open and permit the fruit to pass out into the receptacle.

My improved fruit picker is simple, strong and durable in construction and the upper or picking end thereof is of small compact form and has no projecting parts which would interfere with inserting the same in among the close branches of a tree, and owing to the flexible fastening of the head and picker, the danger of the fruit being bruised or injured by these parts is obviated. By forming the tube or receptacle open at its lower end said end may be readily unfastened from the pole and the fruit picked therein, discharged through said lower end into a basket or receptacle suspended among the branches of the tree by a person on a ladder or in the tree, thus greatly facilitating the picking of the fruit.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention what I claim is;

1. A fruit picker comprising a handle formed of a plurality of separable sections, a flexible shank secured to the handle and formed of spring wire bent intermediate its ends to provide a loop for insertion in the handle, said ends being bent to form spring coils, a head comprising a band secured to the ends of the shank whereby said head is yieldingly secured to the handle, a plurality of inverted U-shaped wire pickers secured to and projecting above the upper edge of said band, each of said pickers having one leg bent inwardly to form an offset adapted to be engaged with the stems of the fruit, and a receptacle adapted to receive the fruit removed by the pickers.

2. A fruit picker comprising a handle, a head having a yielding connection with the upper end of said handle, pickers arranged on said head, a receptacle comprising a fabric tube open at its opposite ends and secured at its upper end to said head, said tube having in its lower end button holes, a stud secured to the handle whereby the lower end of the tube may be buttoned around the handle and thereby closed, a cord having in its upper end a loop engaged with the upper portion of the tube whereby when the cord is pulled the loop will draw the sides of the tube together thus closing the upper end thereof, and means to secure the cord in operative engagement with the handle.

3. A fruit picker comprising a handle formed in a plurality of separably connected sections each of which is provided with a longitudinal guide groove, a head yieldingly attached to the upper end of the handle, pickers arranged on said head, a receptacle comprising a fabric tube secured at its upper end to said head, means to close the lower end of the tube, a flexible tube contracting loop engaged with the upper portion of the tube whereby the latter is drawn together or contracted to close said upper end, an operating cord secured to said loop, said cord being formed in a plurality of sections, one of which is engaged with the groove in each of said handle sections, and means to connect the ends of the cord sections together whereby the loop may be operated from the inner end of the handle to close the outer end of the tube.

In testimony whereof I have hereunto set my hand in presence of two subscribing witnesses.

JOSEPH N. PARKER.

Witnesses:
 LELIA H. HUNNEWELL,
 ROBERT L. KIMBALL.

Copies of this patent may be obtained for five cents each, by addressing the "Commissioner of Patents, Washington, D. C."